Dec. 11, 1962 J. L. BURG 3,067,768
TEMPERATURE COMPENSATED HYDRAULIC CONTROL DEVICE
Filed July 17, 1959 2 Sheets-Sheet 1

INVENTOR.
JOSEPH L. BURG
BY
Flam and Flam
ATTORNEYS.

Dec. 11, 1962 J. L. BURG 3,067,768
TEMPERATURE COMPENSATED HYDRAULIC CONTROL DEVICE
Filed July 17, 1959 2 Sheets-Sheet 2

INVENTOR.
JOSEPH L. BURG
BY Flam and Flam
ATTORNEYS.

United States Patent Office 3,067,768
Patented Dec. 11, 1962

3,067,768
TEMPERATURE COMPENSATED HYDRAULIC CONTROL DEVICE
Joseph Ludwig Burg, Los Angeles, Calif., assignor, by mesne assignments, to Burgmaster Corporation, Los Angeles, Calif., a corporation of California
Filed July 17, 1959, Ser. No. 827,869
2 Claims. (Cl. 137—468)

This invention relates to controlling devices, such as valves, that are arranged to transmit hydraulic fluid, such as oil, to an actuator.

Such a control device is described in Patent No. 2,776,584, issued January 8, 1957, to Fred G. Burg. In that patent, the device is utilized to determine the rate of travel or feed of a tool carrying slide toward the work. The slide is provided with a plurality of tools brought in succession into active relation to the work. In general, the device includes a series of throttling valves adapted to be rendered active in succession to comply with the feed desired for each of the tools. The hydraulic liquid is most conveniently oil that operates upon a piston that imparts motion to the slide.

It is essential that the rate of feed be quite accurately maintained. Yet when the oil temperature rises, due to the pressures exerted upon it as well as other causes, the flow of oil is freer past the valve opening, and accordingly a faster rate of feed than desired is attained.

It is one of the objects of this invention to provide a simple temperature compensator that automatically reduces the area of the valve flow passage upon an increase in temperature of the oil, and yet without disturbing the normal adjustment of the feed rate.

It is another object of this invention to make it possible to compensate for temperature variations of the liquid so as to obtain substantially the same rate of flow through a valve within a reasonable range of temperatures.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings.

Figures 1, 2:
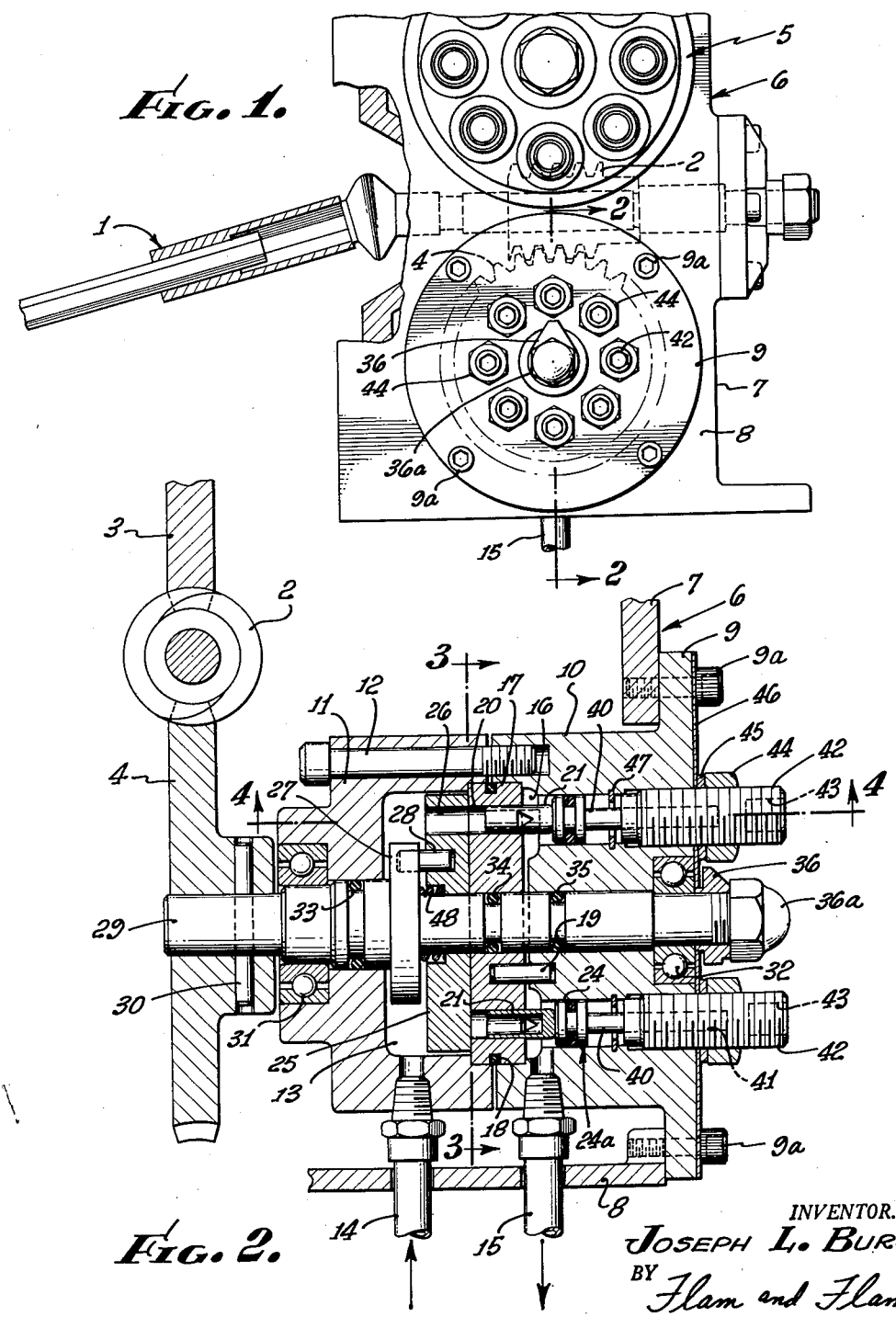
FIGURE 1 is a view, mainly in elevation, of apparatus incorporating the invention.
FIG. 2 is a longitudinal sectional view of the apparatus, the plane of the section being generally along the line 2—2 of FIG. 1.

The apparatus incorporating the invention is utilized to determine the rate of feed of oil or other hydraulic fluid to a tool carrier, as disclosed in the prior patent hereinabove identified. The tool carrier may be angularly adjusted to bring successive tools into position, as therein explained. As this occurs, a shaft structure 1 (FIG. 1) is correspondingly rotated. This shaft 1 appropriately drives a worm 2. This worm 2 in turn serves to actuate a pair of worm wheels 3 and 4 (FIGS. 1 and 2). The worm wheel 3 operates to adjust a speed-control mechanism, indicated generally by reference character 5, with which this invention is not concerned.

The worm wheel 4 serves to adjust in succession the rate of feed for the tool that is being driven, all as explained in said prior identified patent.

A frame 6, which forms the main support for the machine tool, has a vertical wall 7 and a horizontal wall 8 (FIG. 2). Upon this frame 6 is fastened the flange 9 of a casing or body 10. This is effected by the aid of screws 9a, each having a hexagonal socket for the reception of an appropriate socket wrench. This casing or body 10 has a generally cylindrical exterior surface. A cover member 11 is attached to the casing member 10, as by the aid of a number of machine screws 12.

The casing or body 10 and its cover 11 define an inlet chamber 13 into which hydraulic fluid can be passed, as by way of an inlet fitting 14 pipe-threaded into the wall of cover 11. From inlet chamber 13 hydraulic liquid flows through port openings, as hereinafter explained, and finally leaves via an outlet fitting 15 threaded into the wall of the casing or body 10.

An outlet chamber 16 is separated from the inlet chamber 13 by the aid of a valve plate 17 which, with casing 10, defines the chamber 16. This valve plate 17 is clamped between the casing or body 10 and the cover 11. For this purpose, the body 10 and cover 11 are provided with shoulders engaging the edge of valve plate 17 on opposite sides thereof. To provide a seal between the chambers, use may be made of an O-ring 18 disposed in a groove in the periphery of the valve plate 17.

The valve plate 17 is angularly fixed with respect to the body or casing 10 by the aid of one or more pins 19.

Figure 3:
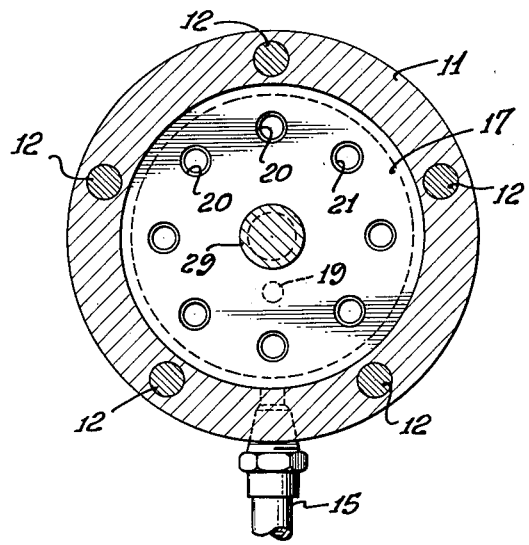
FIG. 3 is a sectional view, taken along a plane corresponding to line 3—3 of FIG. 2.

As shown most clearly in FIGS. 2 and 3, the valve plate 17 is provided with equiangularly spaced through openings forming passages 20 from the inlet chamber 13 to the outlet chamber 16. In the present instance, eight such passages 20 are shown corresponding to a tool head having eight equiangularly disposed tools.

Figure 6:
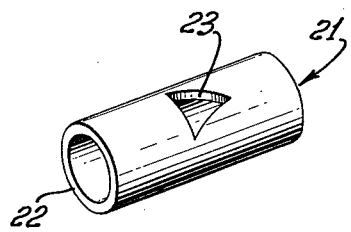
FIG. 6 is a pictorial view of an adjustable valve closure member utilized in connection with the invention.

In each of the passages 20 is disposed an adjustable valve member 21 shown most clearly in FIG. 6. Each valve member 21 has a hollow body portion 22 in communication with its corresponding passage 20. It is also provided with an opening or port 23, shown as triangular in form in the present instance, and adapted to be intersected by the right-hand surface of the valve plate 17. The triangular port 23 is so oriented that the effective opening to outlet chamber 16 is reduced very greatly upon movement of the member 21 inwardly of passage 20.

The position of the member 21 with respect to the plate 17 determines the extent of opening from the passage 20 to the outlet chamber 16. Thus, in the position of FIG. 4, a relatively large portion of the aperture 23 is exposed in the chamber 16. Accordingly, there is relatively little restriction to the flow of hydraulic liquid from the inlet chamber 13 into the outlet chamber 16.

The positioning of the member 21 is effected by fluid pressure acting in chamber 13 to urge it toward the right and against an adjustable head 24. The manner in which this head is adjusted will be explained hereinafter.

Figure 5:
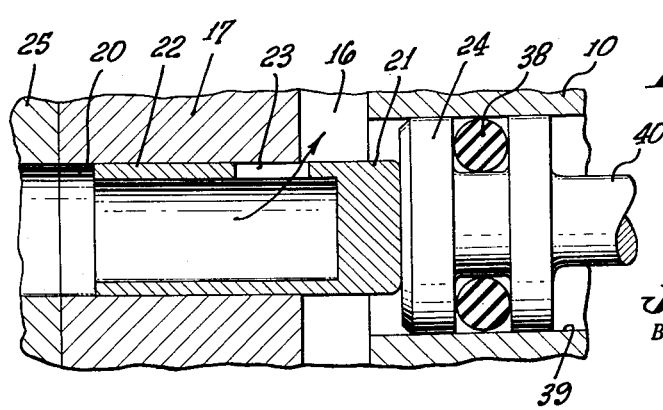
FIG. 5 is a fragmentary view similar to FIG. 4, on a further enlarged scale, and illustrating another adjustment of the valve structure.

In the position of FIG. 5, the member 21 has been adjusted inwardly of the passage 20 so that a relatively narrow or small portion of the opening 23 is exposed in the chamber 16. Accordingly, there is a greater restriction to the flow of hydraulic liquid for feeding the tool and a slower feed is effected. In the innermost position of head 24, the port or opening 23 may be completely closed.

The passages 20 are active one at a time in succession. In order to accomplish this synchronism with the positioning of the tools with respect to the work, a rotary disk 25 is provided, carrying a single port 26. This disk 25 is arranged to be driven by the aid of the worm wheel 4. For this purpose, the worm wheel 4 has a shaft 29 carrying a driving collar 27 coupled, as by a drive pin 28, to the disk 25. A compression spring 48 urges the disk 25 against the valve plate 17. For each advance of the wheel 4 by an angle corresponding to the spacing between the passages 20, a succeeding passage 20 is rendered active. Thus, by individually adjusting the position of the member 21 and its corresponding passage 20, the rate of feed for each tool may be predetermined.

The shaft 29 is appropriately coupled to the wheel 4, as by the aid of a pin 30. It is provided with appropriate ball bearing structures 31 and 32 respectively mounted in the left-hand portion of the cover 11 and in the right-hand portion of the body 10. The valve plate 17 and the body 10 as well as the cover 11 are provided with concentric apertures for the accommodation of this shaft. Appropriate sealing rings 33, 34 and 35 are utilized for sealing the chambers 13 and 16 against leakage to the exterior of the mechanism.

If desired, a pointer 36 (FIGS. 1 and 2) may be fastened to the right-hand end of the shaft 29, as by the aid of a crown nut 36a, for indicating which one of the passages 20 is active.

Figure 4:
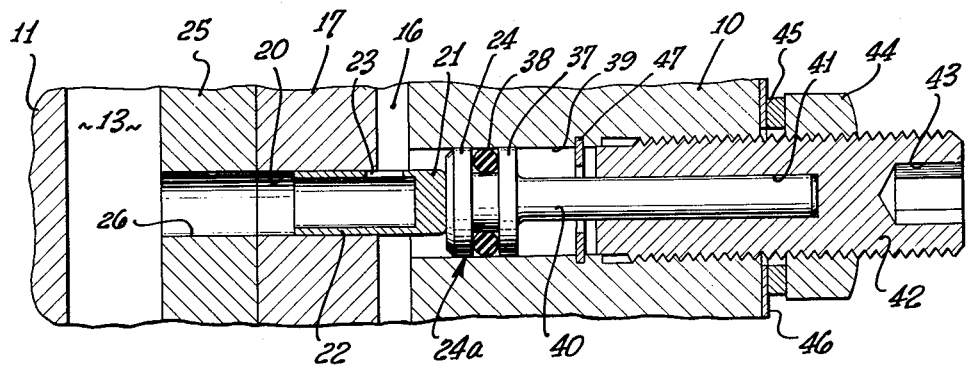
FIG. 4 is a fragmentary sectional view on an enlarged scale, taken along a plane corresponding to line 4—4 of FIG. 2.

Individual and independent adjustment of each adjustable member 21 is effected by mechanism most clearly disclosed in FIG. 4. In this figure, the head 24 is shown as a portion of a member 24a. The head 24 is spaced from a flange 37 on member 24a, and a sealing ring 38 is interposed between the head 24 and the flange 37 so as sealingly to contact the cylindrical opening 39 formed in the body 10.

The member 24a is provided with a stem 40 that fits into a cylindrical aperture 41 of a stud 42. This stud 42 is threaded into the body 10. The stem 40 bottoms in the aperture 41. Accordingly, threading the stud 42 into or out of the body 10 determines the position of he abument head 24. Each stud 42, as indicated in FIG. 1, is provided with a hexagonal socket 43 for making it possible to adjust its position with relation to the member 21. A lock nut 44 engaging a washer 45 is provided for maintaining the adjustment. A thin plate 46 is interposed between the washer 45 and the body 10 for the purpose of carrying appropriate indicia.

As shown in FIG. 4, an expandible spring ring 47 is provided in the cylindrical opening 39 to limit the outward movement of the member 24a should the stud 42 be entirely removed.

The stud 42 as well as the body 10 are preferably made of metal having a relatively low coefficient of expansion, such as steel or cast iron. However, the member 24a is made of metal having a relatively large coefficient of expansion. Such metal may be an appropriate aluminum alloy.

The stud 42 may be initially adjusted to provide appropriate rate of supply of the hydraulic liquid through the outlet fitting 15. Two such positions are indicated in FIGS. 4 and 5. However, as the oil or other liquid in chambers 13 and 16 increases in temperature due to continued circulation, there is a heat exchange from the liquid to the member 24a, increasing its temperature. Accordingly, the head 24 is expanded so as to move toward the left with relation to the socket 41, causing a reduction in the size of the opening 23 exposed to the chamber 16. By appropriate choice of dimensions, this compensation is such as substantially to maintain the rate of feed of the oil or other liquid at the desired value. Thus, there is a compensation for the reduction in viscosity of the liquid at increased temperature.

The inventor claims:
1. In a valve structure for fluids: a valve body having a fluid flow passage, and a wall having an edge portion defined by a surface extending transversely to said wall; an adjustable valving member interposed in said passage, and having a fluid flow channel therein terminating in first and second ports, the first port opening in free fluid communication with said passage and the second port opening in opposed relation to said wall and intersected by said surface, whereby the exposed area of said second port is controlled by the adjusted position of said member in said passage relative to said surface to regulate the flow of fluid through said passage and channel; and an adjustable actuator having an extensive adjustment range mounted in said body and located in fluid communication with said passage for selectively adjusting said member in said passage over an extensive range, said actuator thereby being subjected to the temperature of the fluid flow controlled by said valving member; said actuator having a coefficient of expansion substantially different from that of said supporting means, whereby upon variation in the temperature of said fluid the adjusted position of said member is correspondingly varied; said second port having a generally triangularly tapered configuration along a line transverse to the line on which it is intersected by said surface and the particular shape of said configuration being dependent upon the relationship between the coefficient of expansion of said actuator and the different coefficient of expansion of said supporting means so as to maintain for any given selected setting of said member substantially the same rate of flow of fluid through said second port despite changes in temperature of said fluid over the operating temperature range of said fluid.

2. In a valve structure for fluids as set forth in claim 1: said passage including a bore portion; said valving member being a tubular member telescopically axially slidable in said bore portion, and being closed at one end, said first port being formed in the other end of said member, and said second port being formed in the side wall of said member; and the first mentioned wall being the wall of said bore portion, and said edge portion being an end of said bore portion.

References Cited in the file of this patent

UNITED STATES PATENTS

| | | |
|---|---|---|
| 1,055,307 | Barton | Mar. 11, 1913 |
| 1,401,097 | Nickolaus | Dec. 20, 1921 |
| 1,510,190 | Odum | Sept. 30, 1924 |
| 1,914,677 | Schultz | June 20, 1933 |
| 2,386,051 | Kempton | Oct. 2, 1945 |
| 2,583,291 | Beem | Jan. 22, 1952 |
| 2,658,715 | Kistner | Nov. 10, 1953 |
| 2,669,415 | Gilroy | Feb. 16, 1954 |
| 2,851,241 | Wallgren | Sept. 9, 1958 |
| 2,912,011 | Burg | Nov. 10, 1959 |
| 2,926,885 | Szulc | Mar. 1, 1960 |
| 2,966,170 | Raulins | Dec. 27, 1960 |
| 2,980,392 | Greenwood | Apr. 18, 1961 |

FOREIGN PATENTS

| | | |
|---|---|---|
| 649,667 | Germany | Aug. 31, 1937 |